Jan. 5, 1943. G. B. LANGER ET AL 2,307,517
GLASSWARE HANDLING MECHANISM
Filed Sept. 29, 1939 4 Sheets-Sheet 2

Fig. 2.

Inventors
George B. Langer,
John R. Bridges,
By
Attorneys

Jan. 5, 1943. G. B. LANGER ET AL 2,307,517
GLASSWARE HANDLING MECHANISM
Filed Sept. 29, 1939 4 Sheets-Sheet 3
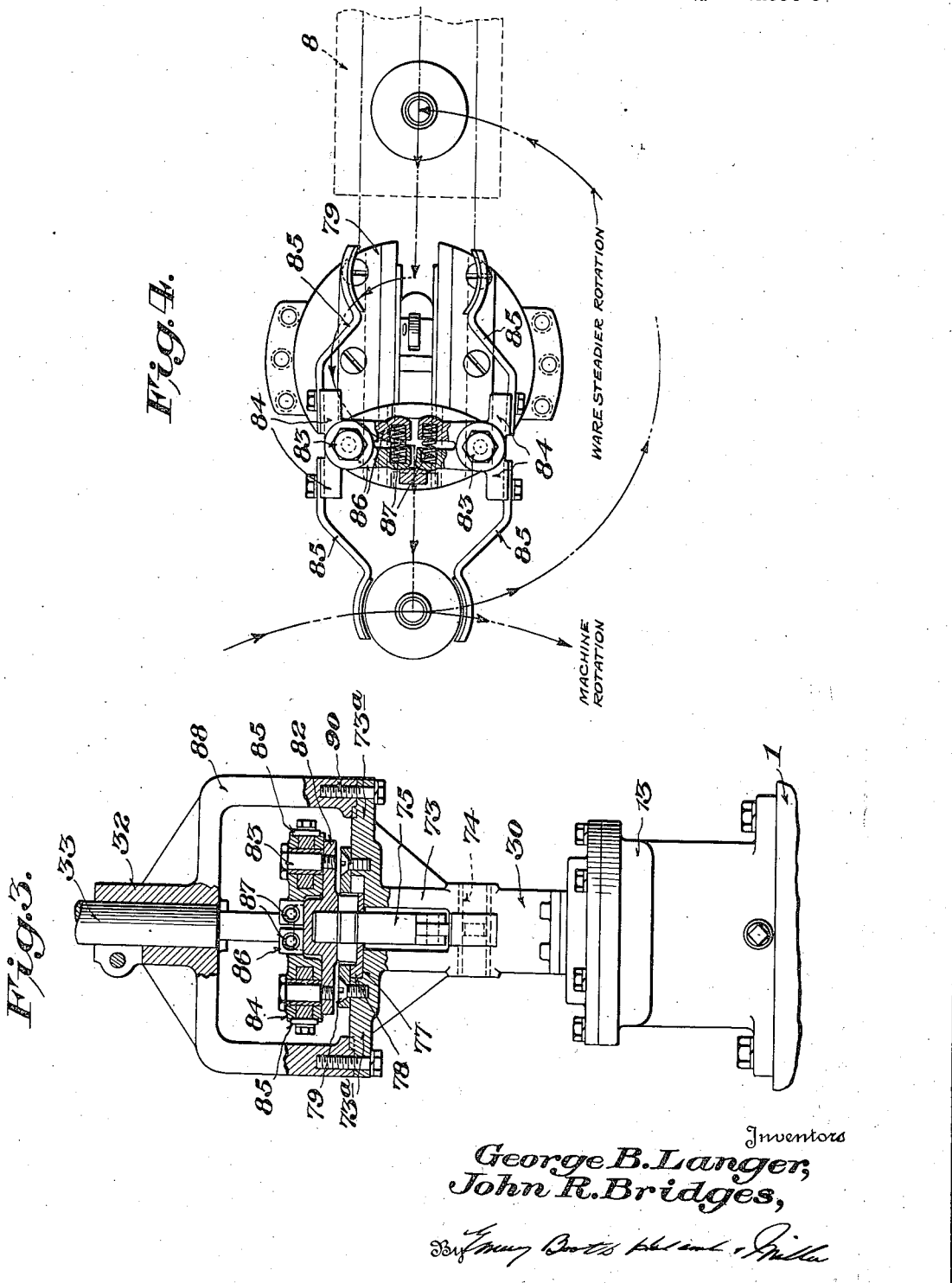
Inventors
George B. Langer,
John R. Bridges,
Attorneys

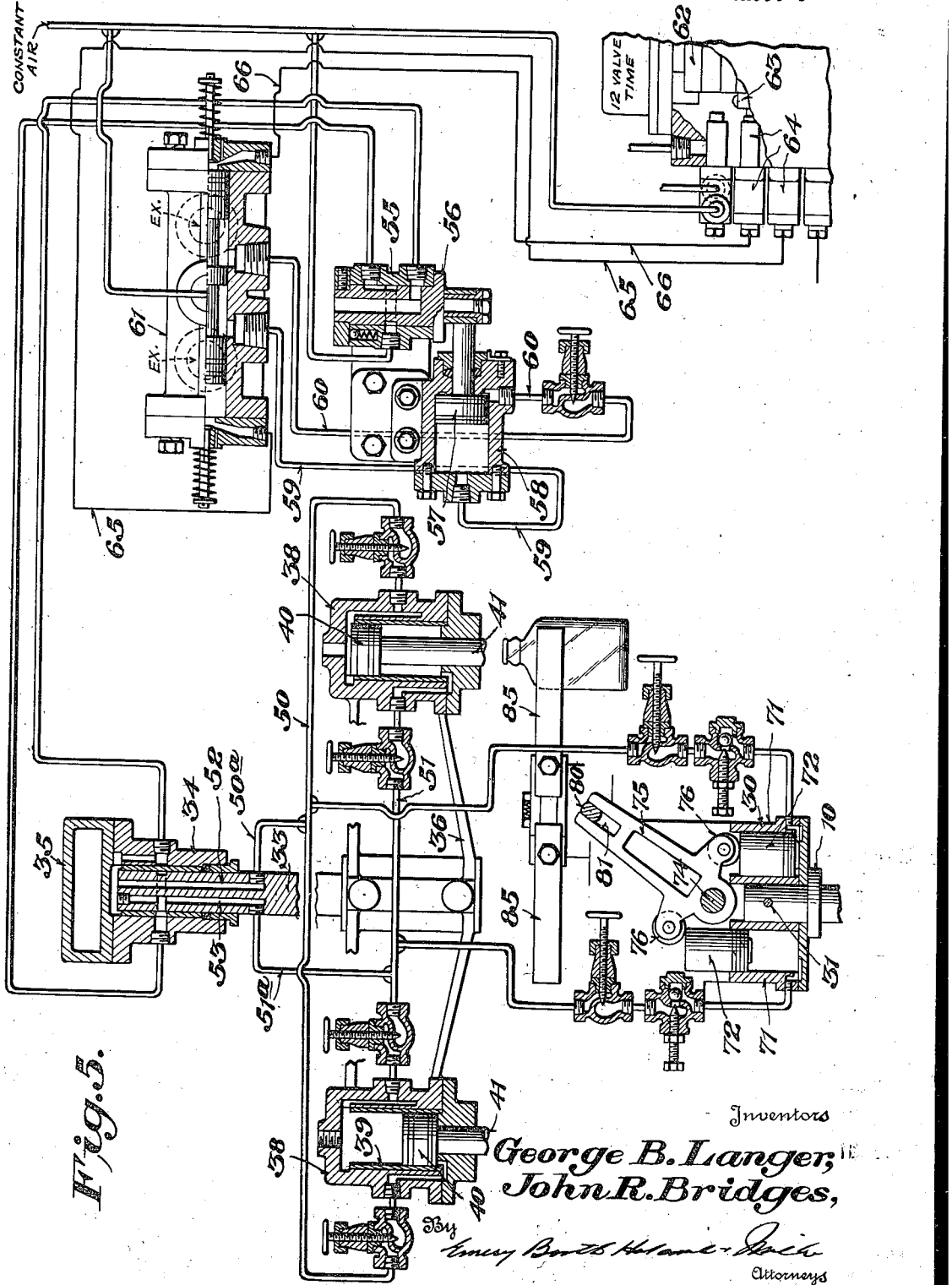

Patented Jan. 5, 1943

2,307,517

UNITED STATES PATENT OFFICE 2,307,517

GLASSWARE HANDLING MECHANISM

George B. Langer and John R. Bridges, Anderson, Ind., assignors to Lynch Corporation, Anderson, Ind., a corporation of Indiana Application September 29, 1939, Serial No. 297,184

3 Claims. (Cl. 198—210)

The present invention relates to glassware handling mechanism for glassware forming machines and aims to provide a new and efficient mechanism for such use.

According to one embodiment of the invention a new and efficient mechanism is provided for steadying the ware as it is removed from the mold and transferred to a conveyor or other suitable removable point of deposit.

When the invention is employed as a ware steadier it is adaptable for use generally with many types of takeout mechanism, but is of especial use in conjunction with the so-called rotary takeouts, as for example, of the type disclosed in the U. S. Patent to Bridges No. 2,015,662, granted October 1, 1935.

Rotary takeouts for glassware forming machines usually comprise a rotary shaft having a crossarm carrying one or more gripping heads. The gripping heads carry gripping jaws adapted to grip the ware by the neck finish and lift it from the bottom plate of the opened mold. Rotation is then imparted to the shaft to rotate the ware from the mold position to a laterally remote position, as for example, over a conveyor when the article is deposited. When such a takeout mechanism is used in conjunction with a rotary forming machine, the takeout shaft is usually geared to the forming machine so as to be rotated in synchronism therewith, and as disclosed in said Bridges Patent No. 2,015,662.

In modern high speed forming machines the speed of rotation of the takeout device acts upon the bottles suspended from the neck ends to swing them outwardly, tending to dislodge them from the takeout jaws. This condition exists with most of the intermittently rotating and continuously rotating machines now in use.

It has been proposed to provide a circular guard rail for limiting the outward swinging movement of the ware, during the takeout, but this has not proven satisfactory as the rail tends to mark the ware.

One embodiment of our invention aims to overcome the above stated objection by providing an improved takeout mechanism having a ware steadier associated therewith, and travelling with the ware for embracing the ware near the bottom end and acting to restrain bodily swinging movement of the ware due to centrifugal force.

Other objects and advantages of the invention will be apparent to those skilled in the art in view of the following more detailed description of one embodiment of the invention selected for illustration in the accompanying drawings:

In the drawings

Fig. 2 is an enlarged view of the ware steadier mechanism shown in Fig. 1;

Fig. 3 is a detail vertical sectional view taken on the line 3—3 of Fig. 1;

Fig. 4 is a detail horizontal sectional view taken on the line 4—4 of Fig. 1;

Fig. 5 is a diagrammatic view illustrating a preferred manner of timing the operation of the various parts of the mechanism.

Figure 1:
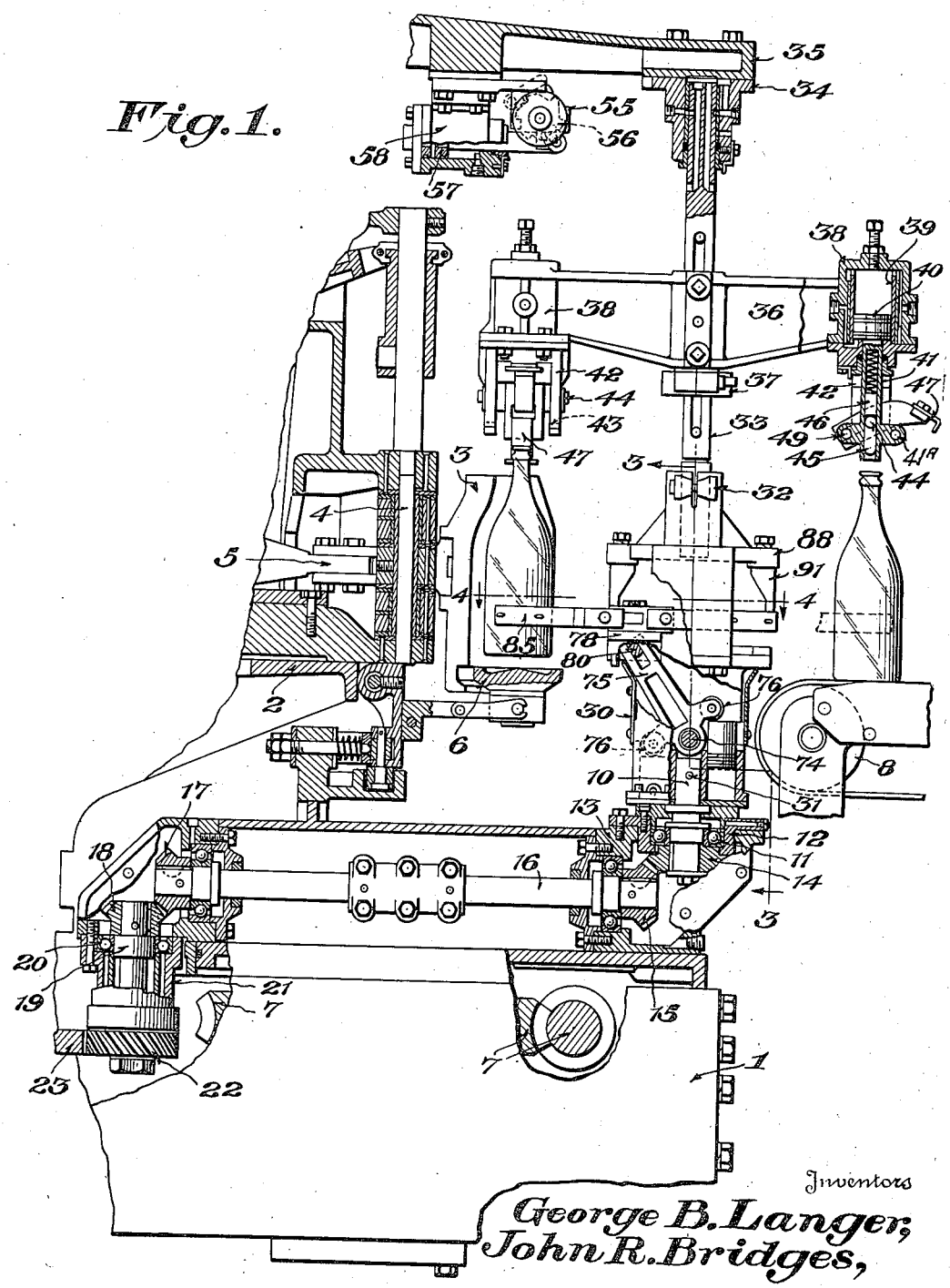
Fig. 1 is a sectional view, partly in elevation, of a portion of a glassware forming machine with our improved takeout and ware steadier mechanism.
Figure 2:
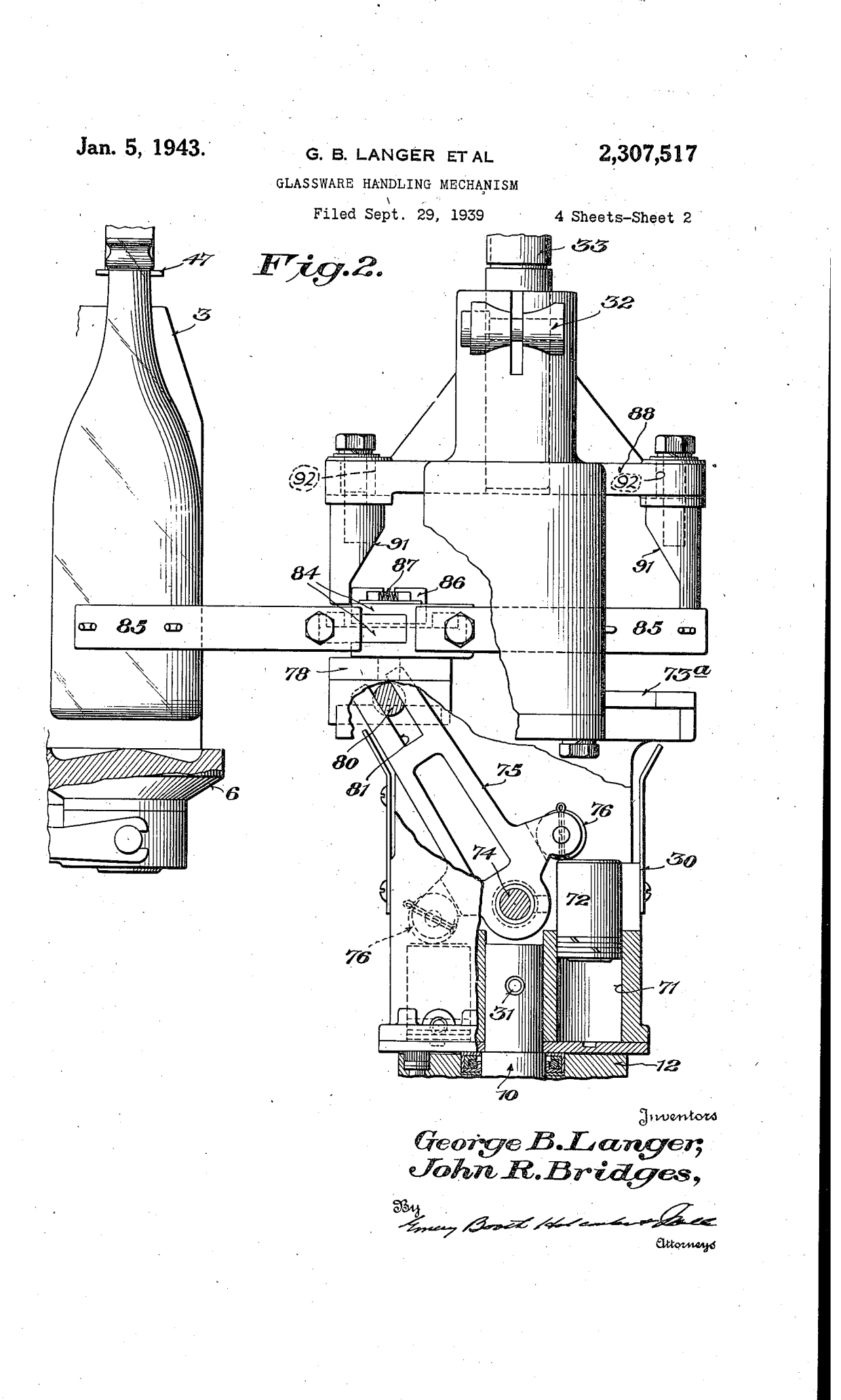

Referring more particularly to the embodiment of the invention shown in Figs. 1, 2, and 5 of the drawings, our improved takeout and ware steadier mechanism is shown as applied to a well known type of bottle forming machine comprising a base 1, rotatably supporting a blow mold carrier 2 upon which is mounted a series of blow mold halves 3, pivotally mounted on a hinge pin 4 and adapted to be moved to closed and opened position by suitable mechanism 5 with relation to a blow mold bottom plate 6. The mold carrier 2 may be rotated either continuously or intermittently by any suitable mechanism, as for example, worm gearing 7, through connections (not shown) as will be readily understood.

The takeout mechanism advantageously comprises a rotatable member carrying article gripping devices adapted to grip and lift the finished articles from the mold bottom plate 6 and upon rotation to remove the ware therefrom and then deposit it at a remote point, as for example upon a conveyor 8.

More specifically, the takeout may comprise a spindle 10 rotatably mounted in anti-friction bearings 11 confined within a cap member 12 forming a part of a housing 13. A bevel gear 14 is keyed to the lower end of the spindle 10 and in turn meshes with gear 15 on shaft 16 rotatably mounted within the housing 13. A gear 17 on the opposite end of the shaft 16 meshes with gear 18 on a spindle 19 journalled in bearings 20 in a depending housing 21 secured to a base 1, said spindle 19 being driven by means of a spiral gear 22 on its lower end in mesh with a ring gear 23 on the mold carrier.

Thus rotation of the spindle 10 is in synchronism with the rotation of the mold carrier. The gearing above described should be such that the spindle 10 receives one half of a revolution for each indexing of the mold carrier, assuming that a two-armed takeout device is used.

A housing 30 is mounted upon the spindle 10 for rotation therewith, being fixed thereto as by a transverse pin 31. The upper end of the housing 30 is preferably fastened to the lower end of shaft 33, as by clamping means 32, the upper end of the shaft 33 being journalled in bearing 34 on a fixed part 35. Thus the spindle 10, housing 30 and shaft 33 constiute, in effect, a unitary rotating part of the takeout.

A cross arm 36 is adjustably carried by the rotary part, being adjustably keyed to the shaft 33 and clamped in adjusted position thereon by clamping nut 37. The opposite ends of the cross arm 36 carry ware-gripping devices comprising a cylinder member 38 which may be formed as a part of the cross arm 36 (see Figs. 1 and 5) in which is a sleeve 39 housing a piston 40 having a depending piston rod 41. The lower end of the cylinders 38 carry depending brackets 42 having elongated slots 43 therein in which is slidably mounted a cross pin 44 extending through an elongated slot of the piston rod 41. Within the hollow piston rod is a spring pressed plunger 46 bearing against the cross pin 44 to hold it in the lower end of the elongated slot 43 of the bracket. A pair of gripping members 47 is pivoted intermediate their ends to the cross pin 44 and at their outer ends rather loosely connected as at 49 to lateral extensions 41a of the piston rod. When the piston 40 is in its lowered position in its cylinder, the spring pressed plunger 46 holds the cross pin 44 and the fulcrum portions of the gripping members 47 in the lower end of the slot 43, thus holding the gripping members in elevated position as shown at the right of Fig. 1, so that the gripping devices may be moved into position over the ware. When it is desired to grip the ware, air is admitted to the lower end of the cylinder 38 to lift the piston 40 therein to effect a downward swinging movement of the gripping members 47 so as to grip the blown ware in the machine preparatory to the removal of it therefrom. Preferably, the arrangement is such that the gripping members grip the ware immediately under the crown or bead of the finish of the bottle.

The port of one cylinder member 38 leading to the upper end of that cylinder is connected by pipe line 50 to a port of the other cylinder leading to the bottom of that cylinder. Similarly, a port of the first cylinder leading to the bottom thereof is connected by a pipe line to a port of the opposite cylinder leading to the upper end thereof so that the two cylinders are interconnected and operate simultaneously in opposite directions. These air lines 50 and 51 respectively, are supplied with air from branch lines 50a and 51a respectively, in the upper end of the takeout shaft 33. These cored air passages are alternately placed on pressure and exhaust by means of a rotary valve 55 intermittently operated by a ratchet mechanism 56 controlled by a piston 57 working in a cylinder 58. The movements of the piston 57 in the cylinder 58 may be controlled by air lines 59 and 60 connected to a main operating valve 61 normally shifted in its opposite directions by air supplied from a suitable source as, for example, the machine timer.

The machine timer may be of any suitable construction but advantageously comprises a power driven timing drum 62 carrying a plurality of cams 63 adapted periodically to open and close valves 64 to supply air alternately to lines 65, 66 leading to opposite ends of the main operating valve 61.

The ware steadier mechanism comprises a ware steadier housing forming a part of the takeout shaft, the casing 30 of which is pinned as at 31 to the spindle 10, as above described, so that the unit is in true parallelism with the takeout cross arm 36. Within the casing there are provided oppositely disposed cylinders 71 having pistons 72 working therein. The upper portion of the casing may be bifurcated providing spaced arms 73 between which is pivotally mounted, as at 74, a rockable lever 75 having extensions 76 overlying the pistons 72. The upper ends of the arms 73 are formed with lateral extensions 73a and a slideway 77 in which is slidable a slide or carriage 78 under gibs 79.

The ware steadying means preferably comprises a horizontal movable forked means having oppositely disposed arms or jaws arranged to embrace the ware as the gripping jaws 47 are operated to grip and raise the ware and to be retracted from the opposite piece of ware as its gripping jaws are opened to release the ware.

The slide or carriage 78 carries a pin 80 engaging in a slotted upper end 81 of the lever 75 whereby the carriage may be moved horizontally in the slideway 77 as the lever 75 is rocked by the pistons 72. The pin 80 is machined to provide flat sides in the center where it engages the forked end 81 of lever 75, the ends of the pin being round and rotatable in the carriage.

According to one embodiment of the invention, the carriage 78 may also include a supporting plate 82 spaced above the gibs 79 and carrying pins 83 rockably supporting the ware steadying jaw operating levers 84. These jaw operating levers 84 are advantageously in the form of bell crank levers mounted in pairs upon each of the hinge pins 83 and arranged in opposed relation to each other. The outer faces of the levers 84 may be formed to receive ware steadying jaw members 85, the arrangement providing for oppositely disposed pairs of jaws as shown in Fig. 4.

The inwardly extending arms of the levers 84 are arranged in opposed relation to each other and their end portions are formed as cups 86 to receive expansion springs 87 normally tending to separate the inwardly extending arms of the levers 84 and maintain both pairs of jaws in open position.

The lateral extensions 73a of the ware steadying casing are connected to the takeout shaft by means of a clamping yoke 88, the central portion of which is clamped as at 32 to the spindle 33, the ends being suitably fastened as at 90 to the extensions 73a. This yoke 88 carries cam faced stop 91 for engaging in inner ends of the levers 84 as the carriage 78 is shifted toward the ware to effect closing movement of the jaw members. The cam stops 91 are adjustable in slots 92 of the yoke 88 so as to adjustably regulate the extent of closing of the jaws around the ware. This is preferably adjusted so that the jaw members closely embrace but do not actually contact the ware, so as to avoid dislodging the ware from the gripper, while not marking the ware by contact between the jaws and the hot ware. The jaws 85 advantageously may be covered with asbestos or like material.

As will be noted in the timing diagram (Fig. 5) the cylinders 71 receive air simultaneously with the actuation of the ware gripper piston 40 so that the piston 72 is raised and the slide 78 moved horizontally toward the ware in the opened mold simultaneously with the actuation of the grippers 47 to grip and lift the ware from the mold bottom plate 6. The takeout shaft then rotates through its predetermined arc (180 degrees as illustrated) to a point when the suspended ware is over the point of deposit, as for example a conveyor. The opposite gripper, at this time, is in cooperative position with a succeeding mold ready to grip the next piece of ware.

In operating the ware steadier mechanism for the next succeeding actuation, the opposite piston 72 is actuated to shift the slide toward the open mold. As the slides move the inner ends of the arms of levers 84 away from adjustable stop 91, the springs 86 become effective to open the ware steadier jaws away from the ware deposited on the conveyor. The slide continues its travel toward the open mold with the inner ends of arms of levers 84 striking the opposite stop 91, closing the arms around the next piece of ware as it is being picked up by the ware gripping tongs 47.

Adjustable check valves 93 may be provided in the air line leading to the cylinder 71 to regulate the flow of air thereto and hence variably control the speed of movement of the carriage 78.

It will be apparent that the invention is not limited to the details of construction and arrangement above described and as shown in the drawings, which are intended merely as an illustration of a preferred embodiment of the invention.

I claim:

1. Takeout mechanism for glassware forming machines comprising a rotatable shaft, a pair of oppositely disposed ware-gripping units mounted on said shaft, a ware-steadying unit connected with said shaft, means for rotating said ware-steadying unit and shaft to move said ware-gripping units successively to a position to pick up the ware and then deposit it at a point remote therefrom, said ware-steadying unit comprising a movable support, means for moving said support horizontally, oppositely disposed pairs of ware-steadying jaws pivotally mounted on said support, and means acting normally to hold said pairs of jaws in opened position.

2. Takeout mechanism for glassware forming machines comprising a rotatable shaft, a pair of oppositely disposed ware-gripping units mounted on said shaft, a ware-steadying unit connected with said shaft, means for rotating said ware steadying unit and shaft to move said ware-gripping units successively to a position to pick up the ware and then deposit it at a point remote therefrom, said ware-steadying unit comprising a movable support, oppositely disposed pairs of ware-steadying jaws pivotally mounted upon said support, means acting normally to hold said jaws in open position, means for moving said support to shift said ware-steadying jaws laterally to position one pair of jaws axially of a ware-gripping unit to embrace the ware held thereby and simultaneously to retract the opposed pair of jaws from the ware deposited by the other gripping unit, and means engaging the jaws as they are moved toward axial alignment with the ware-gripping unit for swinging said jaws to embrace the ware.

3. Takeout mechanism for glassware forming machines comprising a rotatable shaft, a pair of oppositely disposed ware gripping units mounted on said shaft, a ware-steadying unit connected with said shaft, means for rotating said ware-steadying unit and shaft to move said ware-gripping units successively to a position to pick up the ware and then deposit it at a point remote therefrom, said ware-steadying unit comprising a movable support, pneumatically operated means for moving said support horizontally, oppositely disposed pairs of ware-steadying jaws pivotally mounted on said support, and means acting normally to hold said pairs of jaws in opened position.

GEORGE B. LANGER.
JOHN R. BRIDGES.